United States Patent
Iwase et al.

(10) Patent No.: US 6,799,178 B2
(45) Date of Patent: Sep. 28, 2004

(54) GATEWAY APPARATUS AND NETWORK SYSTEM

(75) Inventors: Akinori Iwase, Yokosuka (JP); Tatsuya Haraguchi, Yokohama (JP); Kazuhiro Ogura, Kawasaki (JP)

(73) Assignees: Kabushiki Kaisha Toshiba, Tokyo (JP); Toshiba Tec Kabushiki Kaisha, Tokyo (JP)

( * ) Notice: Subject to any disclaimer, the term of this patent is extended or adjusted under 35 U.S.C. 154(b) by 462 days.

(21) Appl. No.: 09/943,067

(22) Filed: Aug. 31, 2001

(65) Prior Publication Data

US 2002/0045422 A1 Apr. 18, 2002

(30) Foreign Application Priority Data

Oct. 17, 2000 (JP) ........................................ 2000-316786

(51) Int. Cl.⁷ .............................................. G06F 17/30
(52) U.S. Cl. ..................... 707/10; 707/103 R; 707/102; 709/219; 709/217; 709/218; 345/173; 345/810; 455/410; 455/556.2; 375/220; 370/352
(58) Field of Search ............................... 707/10, 103 R, 707/102; 709/217, 218, 219; 345/173, 810; 455/410, 556.2; 375/220; 370/352

(56) References Cited

U.S. PATENT DOCUMENTS

| | | | | |
|---|---|---|---|---|
| 5,923,705 A | * | 7/1999 | Willkie et al. | ............... 375/220 |
| 6,137,791 A | * | 10/2000 | Frid et al. | ................... 370/352 |
| 6,282,433 B1 | * | 8/2001 | Holshouser | ............... 455/556.2 |
| 6,321,257 B1 | * | 11/2001 | Kotola et al. | ................ 709/219 |
| 6,343,317 B1 | * | 1/2002 | Glorikian | ..................... 709/218 |
| 6,466,203 B2 | * | 10/2002 | Van Ee | ........................ 345/173 |
| 6,466,779 B1 | * | 10/2002 | Moles et al. | ................. 455/410 |
| 2002/0030699 A1 | * | 3/2002 | Van Ee | ........................ 345/810 |
| 2003/0123079 A1 | | 7/2003 | Yamaguchi et al. | |

FOREIGN PATENT DOCUMENTS

| | | |
|---|---|---|
| JP | 11-138954 A | 5/1999 |
| WO | WO 97/38389 A2 | 10/1997 |
| WO | WO 98/15091 A1 | 4/1998 |

OTHER PUBLICATIONS

B. Schilit et al., "TeleWeb: Loosely Connected Access to the World Wide Web", Computer Networks and ISDN systems, vol. 28, No. 11, May 1, 1996, pp. 1431–1444.

H. Chang et al., "Web Browsing in a Wireless Environment: disconnected and Asynchronous Operation in ARTour Web Express", MOBICOM97, Proceedings of the Annual International Conference on Mobil Computing and Networking, 1997, p. 260–269.

* cited by examiner

*Primary Examiner*—Frantz Coby
(74) *Attorney, Agent, or Firm*—Foley & Lardner LLP

(57) ABSTRACT

In a network system, only text data is displayed on a portable telephone when access is made to a page which is made public on the Internet by use of the portable telephone. An image of the page and information indicating a URL of the page are stored into a predetermined folder according to an instruction for storage of the page from the portable telephone based on the operation by the user.

15 Claims, 11 Drawing Sheets

FIG. 6

| Account name | Address of portable telephone | Password | User ID |
|---|---|---|---|
|  |  |  |  |
|  |  |  |  |

| Account name | Folder name of internet binder |
|---|---|
|  |  |
|  |  |

| Serial Number | Account name | Page data file | URL | Transfer text file |
|---|---|---|---|---|
|  |  |  |  |  |
|  |  |  |  |  |
|  |  |  |  |  |

| Account name | Full name | Password | User ID |
|---|---|---|---|
|  |  |  |  |
|  |  |  |  |

| Account name | Folder name | |
|---|---|---|
| | | 33b |
| | | |
| | | |

FIG. 11

| | | | | | 33c |
|---|---|---|---|---|---|
| Serial Number | Account name | Folder name | Page data file | URL | Page data file or URL |
| | | | | | |
| | | | | | |
| | | | | | |

FIG. 12

| | | 33d |
|---|---|---|
| Available printer name | Printer address | Printer ability |
| | | |
| | | |
| | | |

FIG. 13

| | | 33e |
|---|---|---|
| Account name | Printer name | Time of use |
| | | |
| | | |
| | | |

FIG. 21

User ID  [1234]
Password  [* * * *]
[Return]  [Log-in]
~43

FIG. 22

Document selection
| URL title 1 |
| URL title 2 |
| URL title 3 |
[Return]  [Select]
~43

FIG. 23

[2in1] [Screen] [Stable] [At time of storage] ~81
[4in1] [Single face] [Sort] [Present] ~82
[1]  ~43
[Return]  [Print]

GATEWAY APPARATUS AND NETWORK SYSTEM

CROSS-REFERENCE TO RELATED APPLICATIONS

This application is based upon and claims the benefit of priority from the prior Japanese Patent Application No. 2000-316786, filed Oct. 17, 2000, the entire contents of which are incorporated herein by reference.

BACKGROUND OF THE INVENTION

1. Field of the Invention

This invention relates to a gateway apparatus used for connecting a mobile terminal such as a portable telephone permitting a Web page and home page which is made public on the Internet to be read and a network system including the gateway apparatus.

2. Description of the Related Art

Recently, mobile terminals such as portable telephones are widely used. Some of the mobile terminals have display sections constructed by small-sized liquid crystal display units and have electronic mail transmission/reception functions or Internet connection functions in addition to portable telephone communication functions.

On the Internet, a lot of Web server apparatuses provide various pages. Most of the pages are created on the assumption that they will be displayed on a display of a personal computer and there are not so many pages which are provided for mobile terminals such as portable telephones. Further, pages other than the pages for the mobile terminals are often formed by use of image data having an extremely large data amount in comparison with text data.

Therefore, the following problems occur when pages other than the pages for the mobile terminals on Internet are read or observed by use of the mobile terminal such as the portable telephone.

(1) Since the mobile terminal has only a small display section, the page created on the assumption that it is displayed on the display section of the personal computer is difficult to be displayed on the display section of the mobile terminal.

(2) Since the memory capacity of a memory provided in the mobile terminal is small, the memory capacity becomes insufficient in some cases if a page created by use of image data having a large data amount is simply received and stored therein.

(3) In the mobile terminal such as the portable telephone, a charging system for making a charge according to a data amount of transmitted/received data is applied in many cases and if a page of a large data amount is received, communication traffic is increased, thereby causing the communication speed to be lowered or the communication cost to be raised. Further, if data of the page which cannot be displayed is fetched into the mobile terminal, the communication cost becomes wasteful for the reasons described in the above items (1), (2).

BRIEF SUMMARY OF THE INVENTION

As described above, this invention has been made to solve the problem that communication traffic is increased and the communication cost becomes often wasteful if a page of a large data amount which is provided on Internet and is difficult to be displayed on the mobile terminal is fetched into the mobile terminal and an object of this invention is to provide a gateway apparatus and network system capable of displaying only displayable information on the mobile terminal and effectively utilizing information on Internet by use of a portable telephone while suppressing an increase in the communication traffic and preventing occurrence of the wasteful communication cost when a page provided on Internet is read by use of the mobile terminal.

Further, another object of this invention is to provide a network system capable of giving the contents of a page which cannot be displayed on the mobile terminal to the user by printing the same by use of an image forming apparatus and providing an image which satisfies the requirement of the user by printing the image of a page obtained at the time of access by use of the mobile terminal or printing the newest contents of a page accessed by the mobile terminal in a case where the contents of the page is printed by use of the image forming apparatus.

A gateway apparatus according to one aspect of this invention having a function of being connected to a mobile terminal and a function of being connected to a network, comprises a modem which makes data communication via the network; an interface which makes data communication with a mobile terminal; and a controller which extracts only data to be transmitted to the mobile terminal from a page which is made public on the network according to a request from the mobile terminal, transmits the extracted data to the mobile terminal and causes the entire page to be stored into a predetermined storage location if an instruction for storage of the entire page is issued from the mobile terminal.

A network system according to another aspect of this invention comprises a first apparatus having a function of being connected to a mobile terminal and a function of being connected to a network; and a second apparatus capable of making data communication with the first apparatus; wherein the first apparatus includes a modem which makes data communication via the network, an interface which makes data communication with a mobile terminal, and a controller which extracts only data to be transmitted to the mobile terminal from a page which is made public on the network according to a request from the mobile terminal, transmits the extracted data to the mobile terminal and transmits data of the entire page and information indicating a predetermined storage location if an instruction for storage of the page is issued from the mobile terminal and the second apparatus includes a memory section which stores data of the entire page transmitted from the first apparatus into the storage location specified by the first apparatus.

A data processing method according to still another aspect of this invention which is used by a gateway apparatus having a modem connected to a network and an interface which makes data communication with a mobile terminal, comprises downloading page data which is made public on the network by use of the modem according to a request from the mobile terminal connected via the interface; extracting only data to be transmitted to the mobile terminal from the page data downloaded in the above step; transmitting the data extracted in the above step to the mobile terminal; and causing data of the entire page to be stored into a predetermined storage location when an instruction for storage of the entire page is issued from the mobile terminal.

Additional objects and advantages of the invention will be set forth in the description which follows, and in part will be obvious from the description, or may be learned by practice of the invention. The objects and advantages of the invention may be realized and obtained by means of the instrumentalities and combinations particularly pointed out hereinafter.

BRIEF DESCRIPTION OF THE SEVERAL VIEWS OF THE DRAWING

The accompanying drawings, which are incorporated in and constitute a part of the specification, illustrate presently embodiments of the invention, and together with the general description given above and the detailed description of the embodiments given below, serve to explain the principles of the invention.

FIG. 6 is a diagram showing an example of the configuration of an address information database;

FIG. 7 is a diagram showing an example of the configuration of a storage destination specifying database;

FIG. 8 is a diagram showing an example of the configuration of a received mail database;

FIG. 9 is a diagram showing an example of the configuration of a user information database;

FIG. 10 is a diagram showing an example of the configuration of a storage destination database;

FIG. 11 is a diagram showing an example of the configuration of a storage file information database;

FIG. 12 is a diagram showing an example of the configuration of a printer information database;

FIG. 13 is a diagram showing an example of the configuration of a printing history database;

FIG. 21 is a diagram showing a display example by a display section of the MFP;

FIG. 22 is a diagram showing a display example by the display section of the MFP;

FIG. 23 is a diagram showing a display example by the display section of the MFP;

DETAILED DESCRIPTION OF THE INVENTION

There will now be described an embodiment of this invention with reference to the accompanying drawings.

Figure 1:
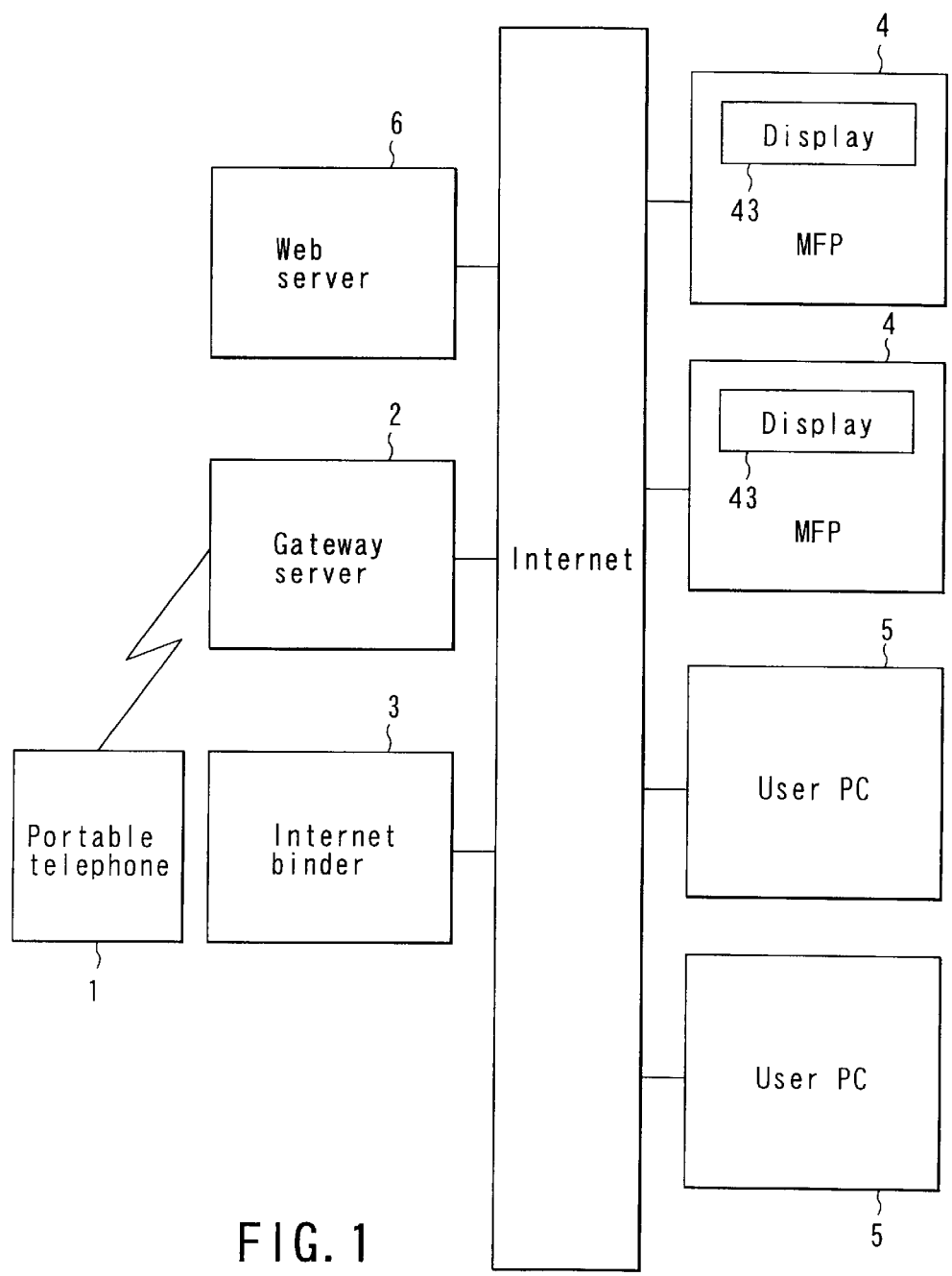
FIG. 1 is a diagram showing the schematic construction of a network system according to an embodiment of this invention.

FIG. 1 is a diagram showing the schematic construction of a network system according to an embodiment of this invention. AS shown in FIG. 1, the network system includes a portable telephone (mobile terminal) 1, gateway server (gateway apparatus, first apparatus) 2, Internet binder (second apparatus) 3, digital multifunctional processor (MFP, image forming apparatus) 4, user PC 5, Web server 6 and the like.

The portable telephone 1 is connected to the Internet (network) via the gateway server 2. Therefore, the portable telephone 1 can access or read a home page or Web page (which is hereinafter simply referred to as a page) provided by the Web server on the Internet via the gateway server 2.

In the present embodiment, the portable telephone 1 is explained as a mobile terminal, but this is not limitative and a mobile terminal such as a mobile mail terminal or PDA (personal digital assistant) which can be connected to the Internet can also be used as the mobile terminal in the same manner.

The gateway server 2 is a gateway apparatus consisting of a computer or the like. The gateway server 2 connects the portable telephone 1 with the Internet 6.

The Internet binder 3 is an apparatus constructed by a computer. The Internet binder 3 transmits or receives data to or from a device such as the gateway server 2, MFP 4, user PC 5 via the Internet. Further, the Internet binder 3 holds (stores) data of a file, for example, received via the Internet.

The MFP 4 is a digital copying machine including a printing device (printer) and image reading device (scanner) and is connected to a public communication line. The MFP 4 is thus connected to the Internet to transmit or receive data via the Internet. Further, the MFP 4 includes a liquid crystal display 43 containing a touch panel.

The user PC 5 is a personal computer (PC) for the user and is connected to the Internet.

The Web server 6 is a server apparatus existing on the Internet to provide (make public) a home page or Web page on the Internet. The above pages are constructed by a file described in HTML (Hyper Text Markup Language). Each page is assigned with a URL (Uniform Resource Locator) for specifying the page. The device which is connected to the Internet downloads the page by specifying the URL and permits the user to read the same.

Further, in the Web server 6, each page specified by the URL may be updated by the operator of the Web server 6 in some cases. Therefore, the page downloaded on the Internet in the past does not always coincide with the present (newest) page specified by the URL. In a case where the downloaded page is read, the stored page can be read by temporarily storing the downloaded page and then reading out the stored page, but if the present page specified by the URL is read, it becomes necessary to specify the URL, newly download the page and then read the same.

Next, the construction of the portable telephone 1 is explained.

Figure 2:
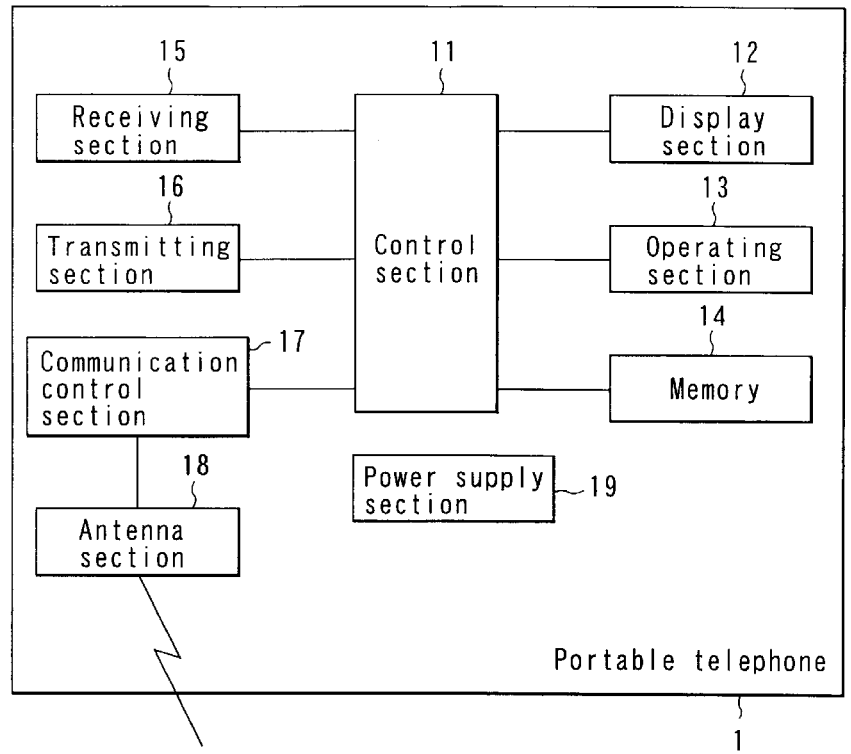
FIG. 2 is a block diagram showing the schematic construction of a portable telephone.

FIG. 2 is a block diagram showing the schematic construction of the portable telephone. As shown in FIG. 2, the portable telephone 1 includes a control section 11, display section 12, operating section 13, memory 14, receiving section 15, transmitting section 16, communication control section 17, antenna section 18 and power supply section 19.

The control section 11 controls the whole portable telephone 1. The display section 12 consists of a liquid crystal display unit to display various messages. The operating section 13 includes various types of keys such as a ten-key pad, and a cursor key to input operation instructions.

The memory 14 includes a storage section used for storing preset data such as a control program and user information and a storage section used for temporarily storing various information, control data and the like. The receiving section 15 is a speaker for outputting a voice when conversation is made by use of the telephone function. The transmitting section 16 is a microphone for inputting a voice when conversation is made by use of the telephone function.

The communication control section 17 controls communication with an external device via the antenna section 18. The power supply section 19 consists of a battery, for example, and supplies electric power to various sections of the portable telephone 1.

Next, the construction of the gateway server 2 is explained.

Figure 3:
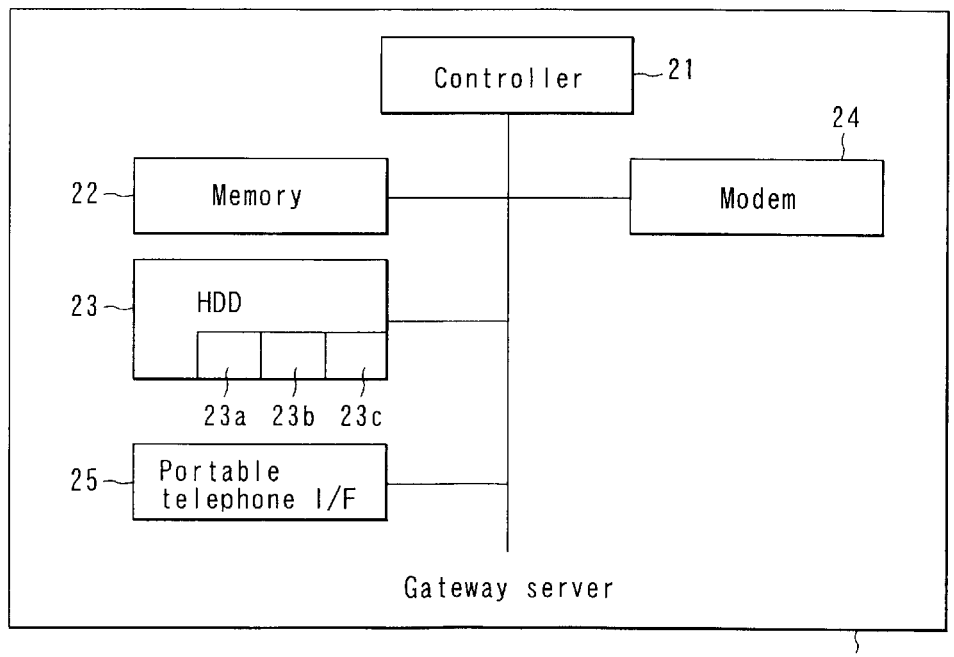
FIG. 3 is a block diagram showing the schematic construction of a gateway server.

FIG. 3 is a diagram showing the schematic construction of the gateway server 2. As shown in FIG. 3, the gateway server 2 includes a controller 21, memory 22, hard disk drive (HDD) 23, modem 24, portable telephone interface 25 and the like.

The controller 21 uses a CPU. The controller 21 controls all operations of the gateway server 2 and is operated according to a program which is previously stored. The memory 22 is used to temporarily store various information items and control data when the controller 21 is operated.

The HDD 23 has previously set information stored therein and stores various data items when the gateway server 2 is operated. Further, the HDD 23 includes databases 23a, 23b, 23c which will be described later. The modem 24 is an interface for connection with the Internet. The portable telephone interface 25 is an interface for connection with the portable telephone.

Next, the construction of the Internet binder 3 is explained.

Figure 4:
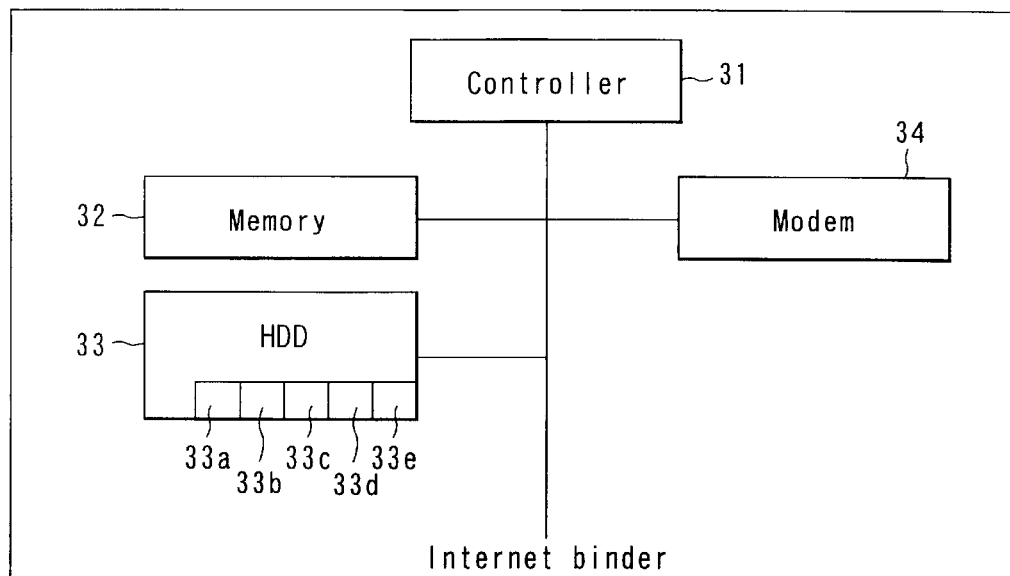
FIG. 4 is a block diagram showing the schematic construction of an Internet binder.

FIG. 4 is a diagram showing the schematic construction of the Internet binder 3. As shown in FIG. 4, the Internet binder 3 includes a controller 31, memory 32, hard disk drive (HDD) 33, modem 34 and the like.

The controller 31 uses a CPU. The controller 31 controls the whole operation of the Internet binder 3 and is operated according to a program which is previously stored. The memory 32 is used to temporarily store various information items and control data when the controller 31 is operated. The HDD 33 stores various data items of files, for example. The HDD 33 includes databases 33a, 33b, 33c, 33d, 33e which will be described later. The modem 34 is an interface connected to the Internet.

Next, the schematic construction of the digital multifunctional processor 4 is explained.

Figure 5:
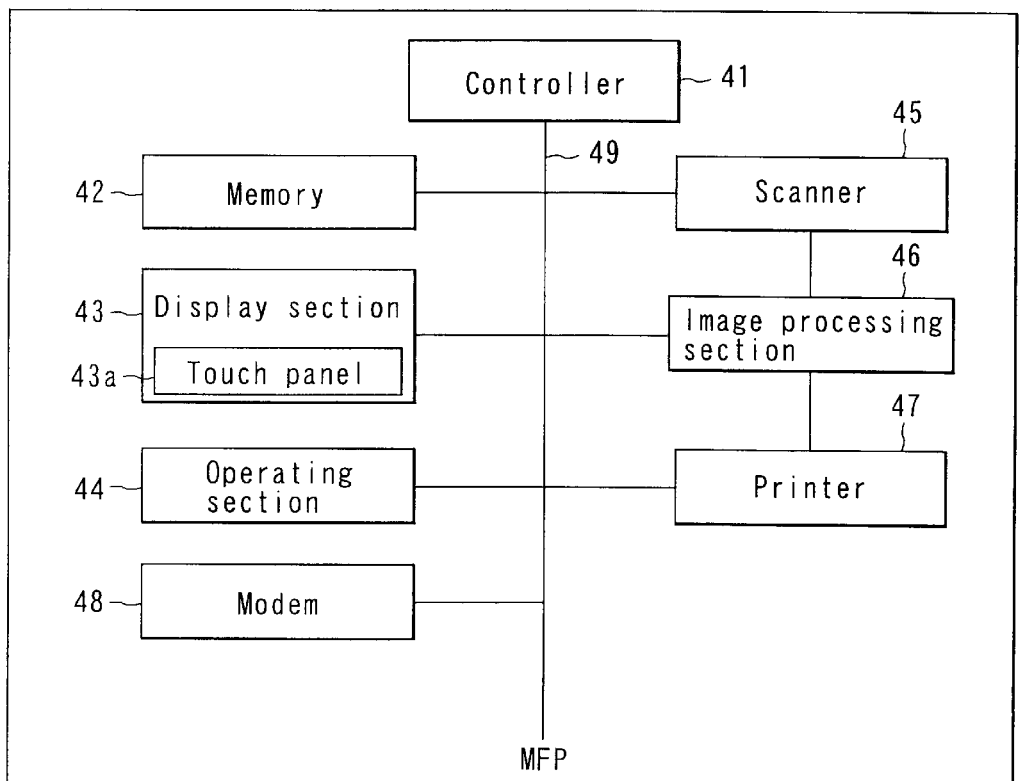
FIG. 5 is a block diagram showing the schematic construction of a digital multifunctional peripheral (MFP)

FIG. 5 is a diagram showing the schematic construction of the digital multifunctional processor 4. As shown in FIG. 5, the digital multifunctional processor 4 includes a controller 41, memory 42, display section 43, operating section 44, scanner 45, image processing section 46, printer 47, modem 48 and the like and the respective constituting elements are connected to one another via a bus 49 with the controller 41 set at the center.

The controller 41 uses a CPU. The controller 41 controls the whole operation of the digital multifunctional processor 4 and is operated according to a program which is previously stored. The memory 42 is used to temporarily store various information items and control data when the controller 41 is operated. The display section 43 is a display constructed by a liquid crystal display device containing a touch panel 43a. The operating section 44 includes hard keys such as a ten-key pad, cursor key and copy start key. Various operations in the digital multifunctional processor 4 are effected by use of the hard keys of the operating section 44 and the touch panel 43a.

The scanner 45 optically scans a document and converts a document image into image data. The image processing section 46 subjects the image data to various processes. The printer 47 prints image data on paper. As the printer 47, various types of printers such as an electrophotographic printer or ink jet type printer may be considered, but in this embodiment, it is assumed that the electrophotographic printer is used. The modem 48 is an interface for connection with Internet.

In the above network configuration, the gateway server 2 and Internet binder 3 are separately provided, but the storage destination of data which the Internet binder 3 stores may be provided in the gateway server 2 and the gateway server 2 can have the function of the Internet binder 3.

Next, the database managed by the gateway server 2 is explained. FIG. 6 is a diagram showing an example of the configuration of the address information database 23a stored in the HDD 23 of the gateway server 2. The address information database 23a indicates information of the user corresponding to the account name and an address of the portable telephone of the user.

As shown in FIG. 6, the address information database 23a contains items of an account name, an address of a portable telephone, password, user ID and the like.

In the item of the account name, an account name given to each user is recorded. In the item of the address of the portable telephone, an address of the portable telephone of the user corresponding to the account name is recorded.

In the item of the password, a password given to the user is recorded. In the item of the user ID, a user ID given to the user is recorded. The user ID may be the same as the account name or may be different from the account name.

FIG. 7 is a diagram showing an example of the configuration of the storage destination specifying database 23b stored in the HDD 23 of the gateway server 2. The storage destination specifying database 23b specifies a storage destination of data previously specified with respect to the account name.

As shown in FIG. 7, the storage destination specifying database 23b contains items of an account name and a folder name of the Internet binder.

In the item of the account name, an account name given to each user is recorded. In the item of the folder name of the Internet binder, a folder name in the HDD 33 of the Internet binder 3 which is specified according to the account name is recorded. The folder name indicates a storage location used when image data of the downloaded page or mail addressed to the user corresponding to the account name is stored in the Internet binder 3.

FIG. 8 is a diagram showing an example of the configuration of the received data database 23c stored in the HDD 23 of the gateway server 2. The received data database 23c records the history of received data such as pages downloaded by the gateway server 2.

As shown in FIG. 8, the received data database 23c is constructed by items of a serial number, account name, page data file, URL, transfer text file and the like.

In the item of the serial number, a consecutive number as the serial number is recorded. The serial number is a number given in a recording order of a corresponding item. In the item of the account name, an account name given to each user is recorded. In the item of the page data file, a file of page data is recorded when the downloaded page is stored as image data. In the item of the URL, a URL of the page recorded in the item of the page data file on the Internet is recorded.

In the item of the text file, a text file consisting only of text data extracted from the page downloaded by the gateway server 2 is recorded. The file consists only of text data. The text file is a file of data transferred to the portable telephone 1 when the page is accessed or read via the gateway server 2 by use of the portable telephone 1.

Next, a database managed by the Internet binder 3 is explained.

FIG. 9 is a diagram showing an example of the configuration of the user information database 33*a* stored in the HDD 33 of the Internet binder 3. In the user information database 33*a*, data used for authenticating the user when an external device is connected to the Internet binder 3 is stored.

As shown in FIG. 9, the user information database 33*a* consists of items of an account name, full name, password, user ID and the like.

In the item of the account name, an account name given to each user is recorded. In the item of the full name, the name (full name) of the user is recorded. In the item of the password, a password given to the user is recorded. In the item of the user ID, a user ID of the user corresponding to the account name is recorded.

FIG. 10 is a diagram showing an example of the configuration of the storage destination database 33*b* stored in the HDD 33 of the Internet binder 3. In the storage destination database 33*b*, a predetermined folder name with respect to the account name is recorded.

As shown in FIG. 10, the storage destination database 33*b* consists of an account name, folder name and the like.

In the item of the account name, an account name given to each user is recorded. In the item of the folder name, a folder name in which user data corresponding to the account name is stored is recorded. For example, in the folder, image data of a page downloaded by the gateway server 2 according to the operation of the portable telephone by the user is recorded.

FIG. 11 is a diagram showing an example of the configuration of the storage file information database 33*c* stored in the HDD 33 of the Internet binder 3. The storage file information database 33*c* indicates the contents of data stored in each folder of the HDD 33.

As shown in FIG. 11, the storage file information database 33*c* consists of a serial number, account name, folder name, page data file, URL, and the like.

In the item of the serial number, a consecutive number as a serial number is recorded. The serial number is a number given in a recording order of corresponding items. In the item of the account name, an account name given to each user is recorded. In the item of the folder name, a folder name in the HDD 33 for recording data received by the user corresponding to the account name is recorded.

In the item of the page data file, a file of image data of a page downloaded by the gateway server 2 according to the operation by the user corresponding to the account name is recorded. In the item of the URL, the URL of a page recorded in the item of the page data file on the Internet is recorded. In the item of the page data file or URL, information indicating one of the page data file and URL which is utilized by the user is recorded.

The user information database 33*a*, storage destination database 33*b* and storage file information database 33*c* are databases used by the Internet binder 3 to manage image data of the page and URL of the page.

FIG. 12 is a diagram showing an example of the configuration of the printer information database 33*d* stored in the HDD 33 of the Internet binder 3. The printer information database 33*d* determines a printer which can be used by the Internet binder 3. Further, in the printer information database 33*d*, the functions of the available printer are indicated.

As shown in FIG. 12, the printer information database 33*d* consists of an available printer name, address of the printer, printer ability and the like.

In the item of the available printer name, an available printer name or names are recorded. In the item of the address of the printer, an address indicating the location of the printer recorded in the item of the available printer name on the network is recorded. In the item of the printer ability, information indicating the ability of the printer recorded in the item of the available printer name is recorded. For example, as the ability of the printer, information indicating color or monochrome printing, printing resolution, printable paper size and the like is recorded.

FIG. 13 is a diagram showing an example of the configuration of the printing history database 33*e* stored in the HDD 33 of the Internet binder 3. The printing history database 33*e* indicates the data printing history stored in the Internet binder 3. Therefore, data indicating the printing history is recorded in the printing history database 33*e* each time printing is performed.

As shown in FIG. 13, the printing history database 33*e* contains items of an account name, printer name, time of use of the printer and the like.

In the item of the account name, an account name given to a user who has used the printer is recorded. In the item of the printer name, the name of the printer used for printing is recorded. In the item of the time of use, time at which printing has been done (time at which the printer has been used) is recorded.

Next, a case wherein access is made from the portable telephone to a page provided by the Web server is explained.

Figure 14:
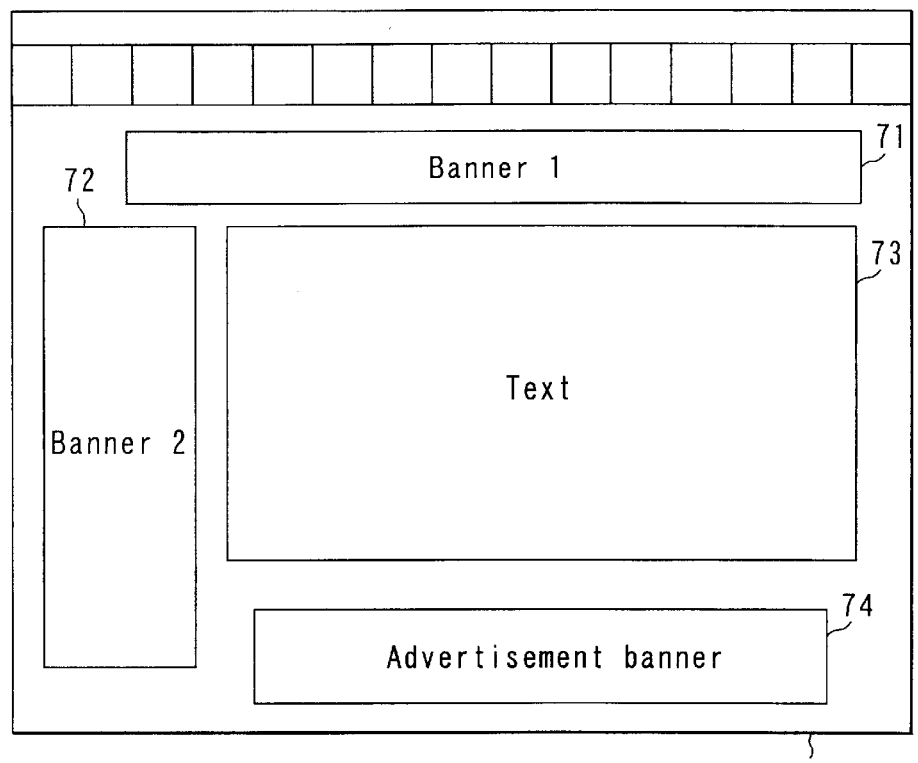
FIG. 14 is a diagram showing an example of a page provided on the Internet by a Web server.

FIG. 14 is a diagram showing an example of a page 70 provided by the Web server 6 on the Internet. The page 70 shown in FIG. 14 is constructed by a banner "1" 71, banner "2" 72, text 73, advertisement banner 74 and the like. The page 70 provided on the Internet is created by assuming that it will be displayed on displays of personal computers.

The page is formed in HTML (Hypertext Markup Language), for example. The banner "1" 71, banner "2" 72 and advertisement banner 74 are formed to carry advertisements and are created as image information. The text 73 is formed by use of a character code.

The page is provided with a URL on the Internet and the Web server is permitted access to it, 6 by specifying the URL.

Assume now that the user specifies the URL by use of the portable telephone 1 to access the page provided by the Web server 6 via the gateway server 2. In this case, the entire page of the specified URL cannot be displayed on the display section 12 of the portable telephone 1. Therefore, the gateway server 2 extracts only text data from the page of the accessed URL and transfers the same to the portable telephone 1. As a result, the portable telephone 1 displays only the text data in the page of the specified URL on the display section 12.

For example, if the URL of the page 70 as shown in FIG. 14 is accessed from the portable telephone 1 via the gateway server 2, the gateway server 2 extracts only the text 73 as text data from the page 70 and transfers the same to the portable telephone 1. Further, the gateway server 2 transfers information indicating that no text is present to the portable telephone if no text data is extracted from data of the downloaded page.

That is, the gateway server 2 distinguishes image data and text data while downloading the page of the URL specified by the portable telephone 1 and extracts the text data. In this case, the gateway server 2 determines data received in the form of image data such as gif, jpg, for example, as image data and determines data based on character data such as a character code as text data.

As described above, the gateway server 2 extracts only text data from the page of the specified URL and transfers the same to the portable telephone 1 when the URL is specified from the portable telephone 1. As a result, data of an amount which cannot be displayed on the display of the portable telephone is not transferred, no wasteful communication traffic occurs and only displayable data can be efficiently displayed on the portable telephone.

Next, a case wherein the page accessed by the portable telephone 1 is printed by use of the MFP 4 is explained.

Figure 16:
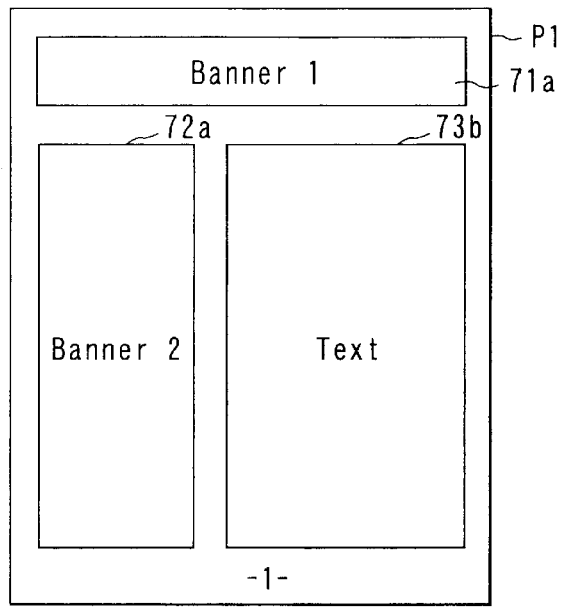
FIG. 16 is a diagram showing an example of a first page when the page of FIG. 14 is optimized to a preset size.
Figure 17:
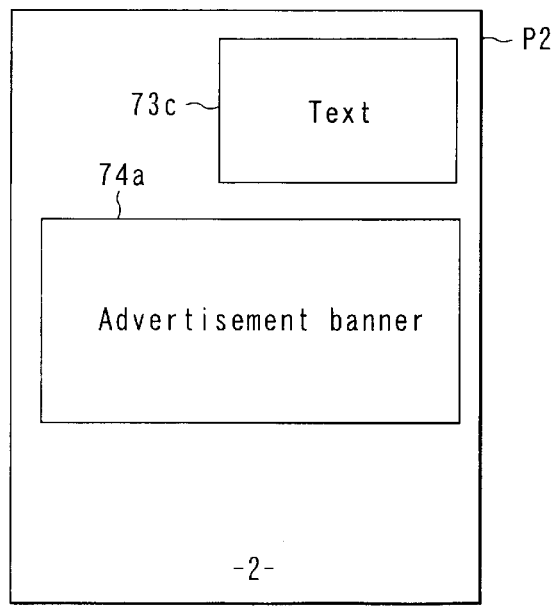
FIG. 17 is a diagram showing an example of a second page when the page of FIG. 14 is optimized to a preset size.

FIGS. 16 and 17 are diagrams showing print examples when the page 70 shown in FIG. 14 is printed by the MFP 4.

Figure 15:
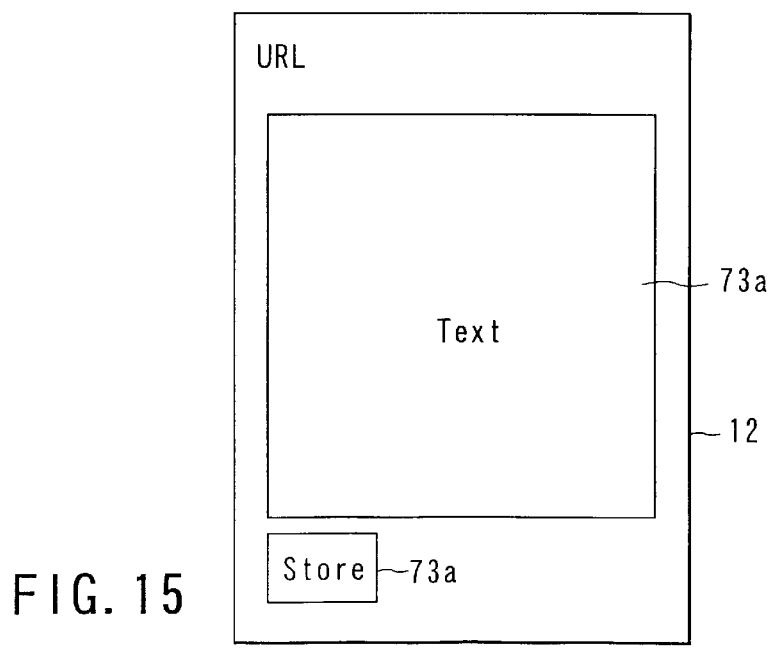
FIG. 15 is a diagram showing a display example when the contents of the page shown in FIG. 14 are displayed on the portable telephone.

Assume now that the user specifies a desired URL by use of the portable telephone 1 to access a page provided by the Web server 6 via the gateway server 2. Then, as described above, the gateway server 2 transfers only text data of the page of the specified URL to the portable telephone 1. Therefore, only the text data of the page of the specified URL is displayed on the display section 12 of the portable telephone 1 as shown in FIG. 15.

Further, if the user specifies storage of the page on the portable telephone 1 side, the portable telephone 1 makes a request of storage of the page with respect to the gateway server 2. In response to the request, the gateway server 2 performs the process for storing the page which is specified to be stored from the portable telephone. When receiving the page storage request from the portable telephone, the gateway server 2 stores the image data of the downloaded page and the URL of the page in the Internet binder 3. At this time, the image data of the downloaded page is converted into image data which is optimized to be efficiently accommodated in a preset size and then stored into the Internet binder 3.

The image data of the page stored in the Internet binder 3 by the above storage process (the image of the page at the time of storage) or the image of the page specified by the URL (the image of the present page) can be read out and printed on paper by the MFP 4.

FIGS. 16 and 17 are diagrams showing print examples when the page shown in FIG. 14 is printed by the MFP 4.

For example, if it is assumed that the page 70 shown in FIG. 14 is printed in an A4 size or B5 size, the image of the page 70 is converted (optimized) to be accommodated in a preset size, for example, A4 size or B5 size as shown in FIGS. 16 and 17. The optimized image is printed on A4 size or B5 paper by the MFP 4.

That is, when receiving an instruction for storage of the entire page from the user who accessed the URL by use of the portable telephone, the gateway server 2 stores the image data of the downloaded page and the URL of the page into the Internet binder 3. After this, if the user attempts to print the image of the page stored in the Internet binder 3 or the image of the present page by use of the MFP 4, the image of the stored page or the image of the present page based on the URL is printed by operating the MFP 4.

As a result, the image data of the page printed by the MFP 4 has been optimized according to a preset size by the gateway server 2. That is, the image of the page stored in the Internet binder 3 is optimized by the gateway server 2 when it is stored into the Internet binder 3. Further, in a case where the image of the present page based on the URL is printed, the gateway server 2 downloads the page from the URL when a printing instruction is made by the MFP 4 and then the image is optimized by the gateway server 2 when the downloaded data is transmitted to the MFP 4.

As described above, in this embodiment, the preset size optimized is a predetermined size, but this is not limitative and the size can be optimized to a size which the user specifies by use of the portable telephone 1 or MFP 4.

FIGS. 16 and 17 are diagrams showing examples when the page shown in FIG. 14 is optimized according to a preset size. The gateway server 2 forms image data by enlarging or reducing constituting elements of the page, or re-arranging them to change the layout and efficiently arrange them in a preset size.

In the example shown in FIG. 14, the banner "1" 71, banner "2" 72 and advertisement banner 74 are downloaded as image data and the text 73 is downloaded as character data such as a character code.

When a page having the constituting elements formed of the image data and the constituting elements formed of the text data is optimized, the gateway server 2 enlarges or reduces the constituting elements of the image data and efficiently arranges them to accommodate them in a preset size. Further, the gateway server 2 determines an area in which the text data of the page is arranged and arrange the text document in the area.

For example, when the image of the page 70 shown in FIG. 14 is optimized as shown in FIGS. 16 and 17, the gateway server 2 changes magnification of the length of the banner "1" 71 in the lateral direction so that the length of the banner in the lateral direction can be accommodated in the length in the lateral direction of an area P1 of preset size. The thus changed banner "1" 71a is arranged in the upper portion of the area P1 of preset size.

Further, the gateway server 2 changes magnification of the length of the banner "2" 72 in the longitudinal direction so that the length of the banner "2" 72 in the longitudinal direction can be accommodated in a space of the area P1 in which the banner "1" 71 has been arranged. The thus changed banner "2", 72a is arranged in the left-side portion of the space of the area P1 in which the banner "1" 71 has been arranged.

Next, the gateway server 2 determines an area in which the text 73 is displayed in a space of the area P1 in which the banner "1" 71a and banner "2", 72a have been arranged. The area in which the text 73 is displayed is acquired on the right side of the banner "2" 72a. In this case, the text which cannot be accommodated in the space of the area P1 of preset size is arranged in an area P2 of preset size. Thus, an image having the banner "1" 71a, banner "2" 72a and text 73b arranged as image data of the first page is formed in the area P1 of preset size. Further, a text 73c which cannot be accommodated in the area P1 of preset size is arranged in the upper position of the area P2 of preset size as image data of the second page.

Finally, the gateway server 2 determines the position in which the advertisement banner 74 is arranged. The advertisement banner 74 is arranged in a space of the area P2 in which the text 73c has been arranged. In this case, the gateway server 2 changes magnification of the length of the advertisement banner 74 in the lateral direction so that it can be accommodated in the length of preset size in the lateral direction. The thus changed advertisement banner 74a is arranged in a position directly below the text 73c. As a result, the text 73c and advertisement banner 74a are arranged in the area P2 of preset size.

As described above, the gateway server 2 stores an image of the page which is optimized according to the paper size used in the MFP 4 into the Internet binder 3 when an instruction for storage of the page is issued from the portable telephone. The MFP reads out and prints a stored and optimized image. Thus, the MFP 4 can provide a printed image obtained by printing the page accessed by the portable telephone in an optimized form for the user.

Further, when the URL is specified by the MFP 4, the gateway server 2 downloads the present page of the URL, optimizes the downloaded page according to the paper size used in the MFP 4 and then transmits the same to the MFP 4. The MFP 4 receives the image of the optimized page from the gateway server 2 and prints the same. Thus, a printed image obtained by printing the page of the URL specified by the MFP in an optimized form can be provided for the user.

Next, a display example displayed on the display section 12 of the portable telephone 1 is explained.

Figure 18:
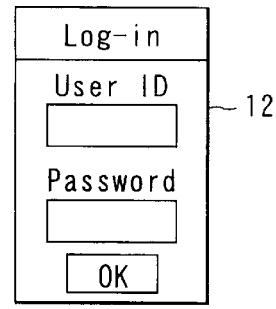
FIG. 18 is a diagram showing a display example by a display section of the portable telephone.

FIG. 18 is a diagram showing a display example of a log-in screen displayed on the display section 12 when log-in is made from the portable telephone 1 to the Internet via the gateway server 2. In the log-in screen of FIG. 18, a user ID input column, password input column, selection column of "OK" and the like are displayed.

On the above display screen, the user inputs the user ID and password by operating the operating section 13. At this time, data items input as the user ID and password are displayed on the respective input columns. If the user ID and password are satisfied, the user selects "OK". As a result, the portable telephone 1 starts the process for connection to the Internet via the gateway server 2.

Figure 19:
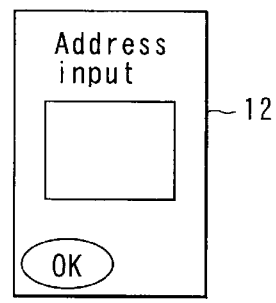
FIG. 19 is a diagram showing a display example by the display section of the portable telephone.

FIG. 19 shows an example in which an address (URL) input screen is displayed which is used for accessing a page provided by the Web server 6 on the Internet from the portable telephone 1 after the portable telephone 1 logs in the gateway server 3.

In the display example shown in FIG. 19, an address (URL) input column and "OK" selection column are displayed. On the above display screen, the user inputs an address by operating the operating section 13. At this time, the URL input as the address is displayed in the address input column. If the address displayed in the input column is satisfied, the user selects "OK". As a result, the portable telephone 1 starts the process for connection to the URL via the gateway server 2.

Figure 20:
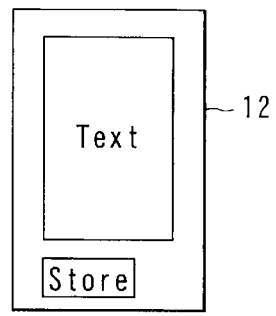
FIG. 20 is a diagram showing a display example by the display section of the portable telephone.

FIG. 20 is a diagram showing an example in which the page of an address specified on the address input screen is displayed on the display section 12 of the portable telephone 1.

In the display example shown in FIG. 20, only the text of the page specified on the address input screen is displayed on the display section 12.

On the display screen shown in FIG. 20, if the user specifies a "storage" selection column, the gateway server 2 optimizes the downloaded page according to the preset size. The optimized image data and information indicating the URL are stored in the Internet binder 3.

At this time, it is assumed that the storage destination in the Internet binder 3 is previously set for each user by the storage destination specifying table 23b. Further, in this case, the folder name of the storage destination is fixedly set by a predetermined folder, but it is possible for the user to specify the folder of the storage destination by use of the portable telephone 1. At this time, the folder name of the storage destination is instructed together with storage of information to be stored from the portable telephone 1 to the gateway server 2. In the Internet binder 3 which has received the above instruction, data received from the gateway server 2 is stored into the specified folder irrespective of the predetermined folder.

Next, a case wherein the image of the present page in the URL or the image of the page stored in the Internet binder 3 is printed by the MFP 4 is explained.

FIGS. 21 to 23 are diagrams showing display examples of the display section 43 of the MFP 4 when the attached file is printed by use of the MFP 4.

First, the user inputs a user ID and password by operating the touch panel 43a and operating section 44 when the image of the present page in the URL or the image of the page stored in the Internet binder 3 is printed by use of the MFP 4.

FIG. 21 shows a display example of an input screen of the user ID and password. On the input screen shown in FIG. 21, a user ID input column and password input column are displayed on the display section 43 and a "return" key and "log-in" key are displayed by a touch panel 43a. While the above input screen is being displayed, the user inputs a user ID and password. Then, if the input user ID and password meet the requirement, the user touches the "log-in" key by use of the touch panel 43a.

Then, the controller 41 of the MFP 4 transmits the user ID and password as log-in data to the Internet binder 3 by use of the modem 48. In the Internet binder 3, the user authentication process is effected by use of the log-in data received based on the user information table 33a. If the user is authenticated by the user authentication process, the Internet binder 3 makes connection with the MFP 4. The Internet binder 3 which has made connection with the MFP 4 reads out a page data file and URL by use of the table 33c based on the user ID transmitted from the MFP 4. Then, the Internet binder 3 transmits the file name of the readout page data file and URL to the MFP 4.

Then, as shown in FIG. 22, the MFP 4 displays a selection screen (document selection screen) used for selecting a page to be printed on the display section 43 based on the received file name and URL. On the selection screen, file names are displayed on the touch panel 43a as titles used for specifying the page and URL of the page. The user selects the page displayed on the selection screen by use of the touch panel 43a and then touches the "selection" key.

Then, the MFP 4 displays a print setting screen as shown in FIG. 23 on the display section 43. On the print setting screen, various settings at the time of printing are made and whether an image of the page at the time of storage or an image of the present page based on the URL is printed as a page to be printed is determined.

For example, on the print setting screen shown in FIG. 23, a "storage-time" key 81 and "present" key 82 can be selected by use of the touch panel 43a. The "storage-time" key 81 is used for instructing printing of a page obtained when the page is downloaded from the Web server 6. Further, the "present" key 82 is used for instructing printing of the newest page according to the URL instead of the page obtained when the page is downloaded from the Web server 6.

That is, there is always a possibility that the page provided on the Internet by the Web server 6 is updated. Therefore, even if the page is a page specified by the same URL, the contents of the page at the actual downloading time and the contents of the present page are different from each other in some cases. For example, there is a strong possibility that a page of news or weather forecast may be frequently updated. There seems a possibility that the user who has accessed such a page by use of the portable telephone 1 wants to see either the page displayed at the access time or the newest page.

That is, in a case where the user wants to see the news displayed when access is made by use of the portable telephone 1, the user cannot get information which he wants to get in some cases even if the newest page is printed, but the user can get information which he wants to get if the page at the time of access is printed.

Further, in a case where the user wants to get the newest information such as weather forecast or traffic information, the newest information cannot be obtained in some cases if the page downloaded at the time of access by use of the portable telephone 1 is printed, but the user can get the newest information if the newest information is printed based on the URL.

As described above, in a case where a page is printed by the MFP 4 after the page provided by the Web server 6 is accessed by use of the portable telephone 1, it is permitted to select printing of the page obtained at the time of access or printing of the newest page. Therefore, the contents of the page satisfying the user's requirement can be printed.

Next, data transmitted/received between the portable telephone 1, gateway server 2 and Internet binder 3 is explained.

Figure 24:
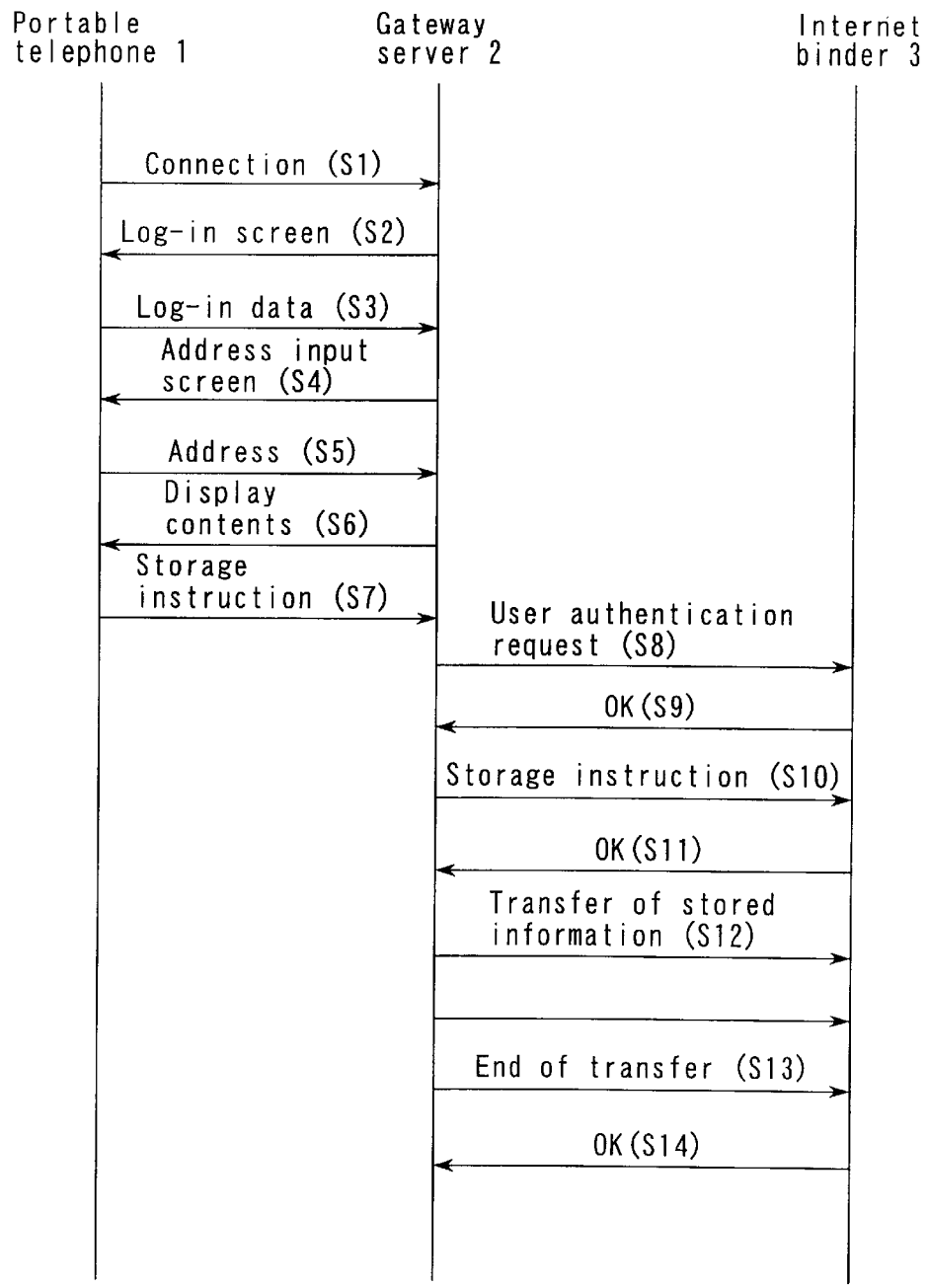
FIG. 24 is a diagram for illustrating data transmitted/received between the portable telephone, gateway server and Internet binder.
Figure 25:
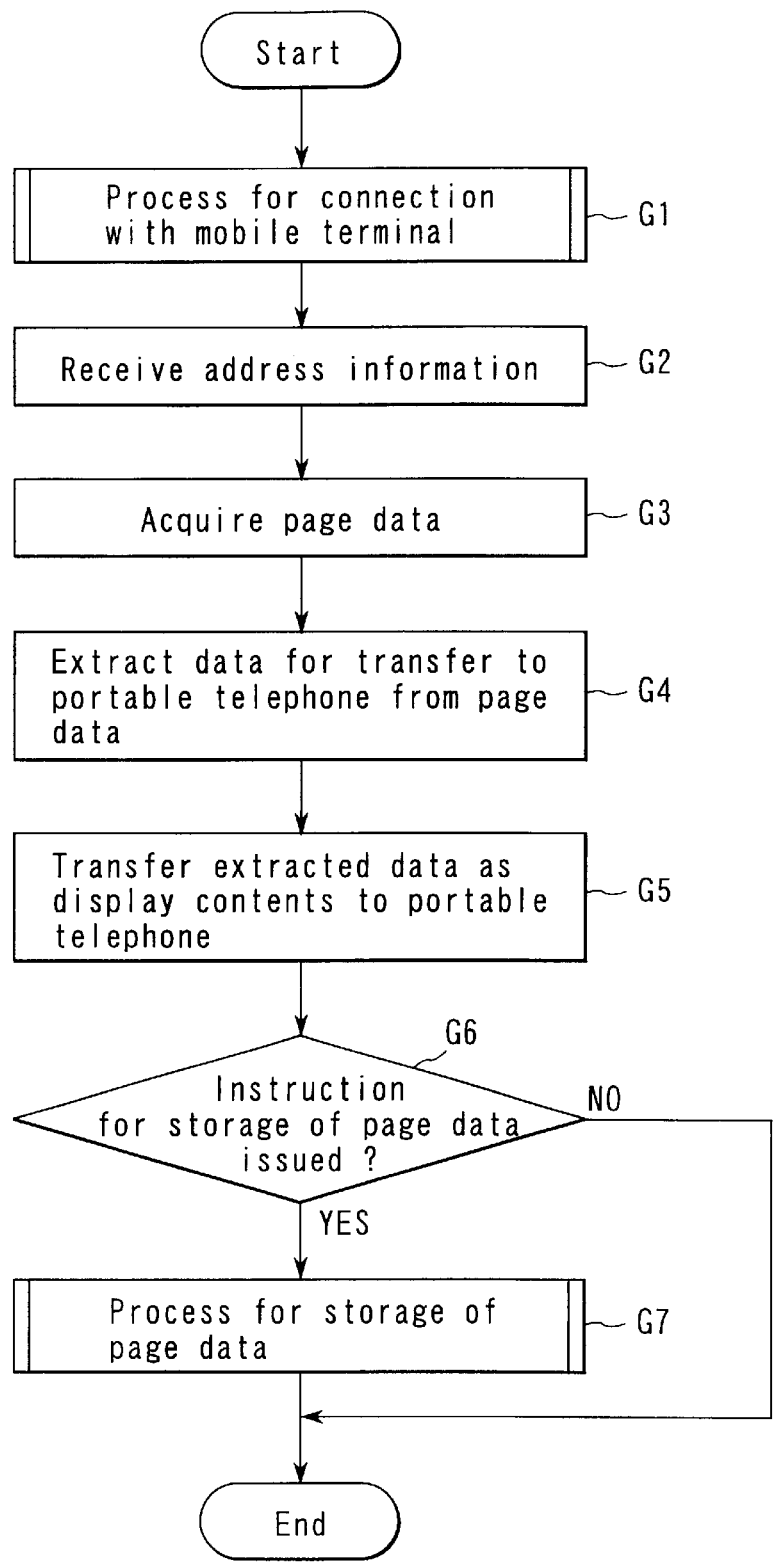
FIG. 25 is a flowchart for illustrating the process of the gateway server.

FIG. 24 is a diagram for illustrating data transmitted/received between the portable telephone 1, gateway server 2 and Internet binder 3. Further, FIG. 25 is a flowchart for illustrating the process of the gateway server 2. In this example, the operation for storing a URL specified by the portable telephone 1 and information of the page of the URL into the Internet binder 3 is explained.

First, the user selects a function of connection to Internet on a menu screen (not shown) of the portable telephone 1. Then, the portable telephone 1 makes a connection request to the gateway server 2 so as to be connected to the Internet. Thus, if the portable telephone 1 makes a request for connection (step S1), the gateway server 2 transfers a log-in screen to be displayed on the display section 12 of the portable telephone 1 as shown in FIG. 18 to the portable telephone 1 (step S2).

When the portable telephone 1 receives the log-in screen from the gateway server 2, it displays the log-in screen as shown in FIG. 18 on the display section 12 and suggests inputting the user ID and password to the user. If the user inputs the user ID and password on the log-in screen, the portable telephone 1 transmits log-in data to the gateway server 2 based on the input user ID and password (step S3).

When receiving the log-in data from the portable telephone 1, the gateway server 2 determines permission or non-permission of the log-in according to whether or not the received user ID and password coincide with the user ID and password recorded on the address information database 23a. If the log-in is permitted in the above determination step, the gateway server 2 determines that connection with the portable telephone 1 is set up and the process for connection with the portable telephone 1 is completed (step G1).

If it is determined in the above determining step that the log-in of the portable telephone 1 is permitted, the gateway server 2 transfers an address input screen to be displayed on the display section 12 of the portable telephone 1 as shown in FIG. 19 to the portable telephone 1 (step S4).

When receiving the address input screen from the gateway server 2, the portable telephone 1 displays the address input screen as shown in FIG. 19 on the display section 12 and suggests inputting an address (URL) to the user. If the user inputs a URL on the address input screen, the portable telephone 1 transmits the input URL to the gateway server 2 (step S5).

When receiving the URL from the portable telephone 1 (step G2), the gateway server 2 accesses the page of the URL and downloads the page (step G3). When downloading the page, the gateway server 2 extracts only text data from data of the downloaded page and forms a file of text data (step G4). When extraction of text data from the entire page is completed, the gateway server 2 transmits the extracted text data as the display contents to the portable telephone 1 (step S6, step G5). At this time, the gateway server 2 transmits a message indicating that there is no text as the display contents to the portable telephone 1 if no text data is extracted from the page at all.

When receiving the display contents from the gateway server 2, the portable telephone 1 displays the received display contents on the display section 12 as shown in FIG. 20. If the user instructs storage of the page by selecting the "storage" selection column 75 in the display state as shown in FIG. 20, the portable telephone 1 transmits an instruction for storage of the page to the gateway server 2 (step S7).

When receiving the instruction for storage from the portable telephone 1 (step G6), the gateway server 2 starts the process for storing the page into the Internet binder 3 (step G7). In the process for storing the page, the gateway server 2 optimizes the downloaded page according to a preset size. When forming data of the optimized page, the gateway server 2 transmits a request for user authentication with respect to the user who has issued the instruction for storage to the Internet binder 3 (step S8). At this time, the user ID and password transmitted from the portable telephone 1 as the log-in data in the step S3 are transmitted as data used for user authentication from the gateway server 2 to the Internet binder 3.

The Internet binder 3 performs the user authentication process based on the user ID and password received from the gateway server 2. The user authentication process is performed by determining whether or not the user ID and password received from the gateway server 2 coincide with the contents recorded on the user information database 33a. When the user is authenticated by the user authentication process, the Internet binder 3 transmits notification indicating that the user has been authenticated to the gateway server 2 (step S9).

When receiving information indicating that the result of the user authentication is "OK" from the Internet binder 3, the gateway server 2 transmits an instruction for storage of storage information including the URL and the data of the optimized page to the Internet binder 3 (step S10). As the instruction for storage, information used for specifying a folder of the storage destination based on the storage destination specifying database 23b is transmitted.

When receiving the instruction for storage of the storage information, the Internet binder 3 determines whether or not the storage information can be stored in the specified storage destination based on the account name and folder name recorded on the storage destination database 33b. If it is determined in the above determination process that the storage information can be stored in the specified storage destination, the Internet binder 3 transmits notification for permitting (giving "OK" for) storage of the storage information to the gateway server 2 (step S11).

When receiving notification of permission of storage from the Internet binder 3, the gateway server 2 transfers the storage information to the Internet binder 3 (step S12). After this, when the gateway server 2 terminates transfer of the storage information, it transmits notification indicating termination of transfer of the storage information to the Internet binder 3 (step S13).

While the storage information is being transferred thereto from the gateway server 2, the Internet binder 3 sequentially stores the information indicating the URL and image data of the optimized page into a specified folder. When receiving notification indicating termination of transfer of the storage information from the gateway server 2, the Internet binder 3 records the respective items of the storage file information database 33c and transmits notification indicating completion of storage of the storage information to the gateway server 2.

As described above, when a page provided on the Internet by the Web server is accessed by the portable telephone, only text data is displayed on the portable telephone and information indicating the URL of the page and the image of the page is stored into the predetermined folder in response to the page storage instruction from the portable telephone based on the operation by the user.

As a result, only text data displayable on the portable telephone is extracted from the page and transmitted to and displayed on the portable telephone without transmitting data of the entire page to the portable telephone. Further, information of the page can be stored so that the page can be read or printed according to the instruction from the portable telephone. Accordingly, only data which can be utilized on the portable telephone can be transmitted without transmitting useless data which cannot be used on the portable telephone and there occurs no useless communication. Further, information of the page can be stored according to the instruction from the portable telephone and the applicability thereof is enhanced.

Next, transmission/reception of data between the Internet binder 3 and the MFP 4 is explained.

Figure 26:
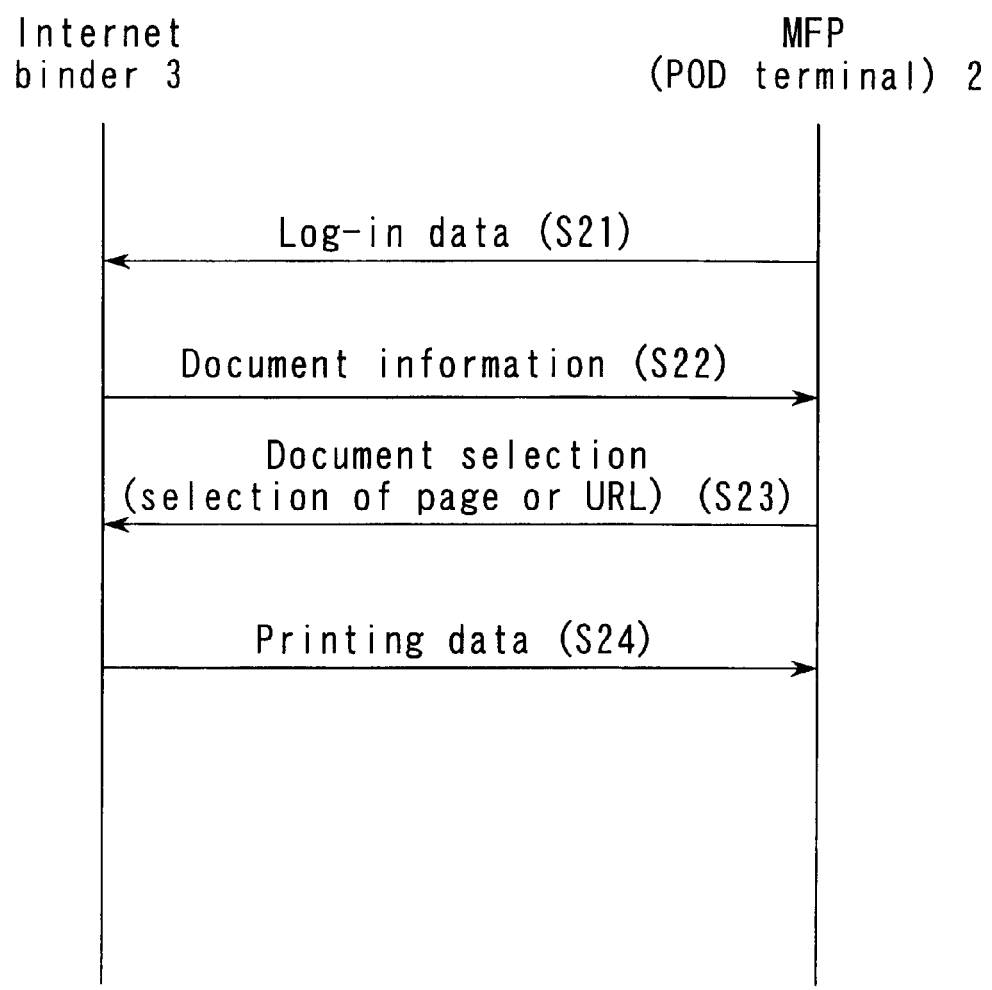
FIG. 26 is a diagram for illustrating data transmitted/received between the Internet binder and MFP.

FIG. 26 is a diagram for illustrating data transmitted/ received between the Internet binder 3 and the MFP 4. In this example, the operation effected when the user prints a present page based on the URL or image data of a page stored in the Internet binder 3 is explained.

First, when a present page based on the URL or image data of a page stored in the Internet binder 3 is printed, the user performs the log-in operation on the log-in screen as shown in FIG. 21 in the MFP 4. Log-in data input on the log-in screen is transmitted to the Internet binder 3 (step S21).

The Internet binder 3 performs the user authentication process based on the log-in data transmitted from the MFP 4. At the time of authentication of the user, the Internet binder 3 transmits information indicating the URL and a file name indicating image data of the page which the user stores as document information to the MFP 4 based on the storage file information database 33c (step S22).

When receiving the document information from the Internet binder 3, the MFP 4 displays a document selection screen for selecting one of pages (documents) to be printed as shown in FIG. 22 on the display section 43 based on the received document information. The user selects one of the pages to be printed on the document selection screen.

Then, the MFP 4 displays a print setting screen as shown in FIG. 23 on the display section 43. The user selects the "storage-time" key 81 used for selecting printing of image data of the page at the time of storage into the Internet binder 3 or the present key 82 used for selecting printing of the image of the present page in the URL and then specifies the "print" key.

Then, the MFP 4 transmits a document selection instruction including information indicating the selected page (document) and information indicating which one of the image of the stored page and the image of the present page in the URL is printed to the Internet binder 3 (step S23). When receiving the document selection instruction from the MFP 4, the Internet binder 3 transmits printing data of the selected page to the MFP 4. As a result, the MFP 4 prints the page received as printing data from the Internet binder 3.

Further, in the above example, the gateway server 2 downloads data of a page based on the URL and optimizes the downloaded page when an image of the present page is printed, but the MFP 4 can perform the process for downloading data of a page based on the URL and optimizing the downloaded page.

As described above, an image of a page accessed by the portable telephone is stored in a predetermined folder and the stored page is printed by use of the image forming apparatus. As a result, even if the entire page cannot be displayed on the portable telephone, the image of the page can be printed by use of the image forming apparatus and the user can read the entire page by use of the printed page.

Further, since the image of the page printed by the MFP 4 is optimized according to the printing size, the contents of the page can be provided in an easily observable form for the user.

Information of a page accessed by the portable telephone and the address of the page are stored and whether the contents of the page at the storage time are printed or the present page of the above page is printed can be selectively determined.

Therefore, the contents of the page at the storage time or the newest contents of the stored page can be selectively printed according to selection by the user and the applicability thereof by the user can be enhanced.

Additional advantages and modifications will readily occur to those skilled in the art. Therefore, the invention in its broader aspects is not limited to the specific details and representative embodiments shown and described herein. Accordingly, various modifications may be made without departing from the spirit or scope of the general inventive concept as defined by the appended claims and their equivalents.

What is claimed is:

1. A network system having a server and an image forming apparatus, the server comprising:

a mobile terminal interface that interfaces with a mobile terminal;

a modem which acquires data of a page which is made public on a network in response to a request from the mobile terminal interface for acquiring the page which is made public on the network; and a controller which stores the data of the page acquired by the modem in a predetermined storage location where the mobile terminal instructs storage of the data of the page, and the image forming apparatus comprising:

an interface that acquires the data of the page acquired by the server from the network, from the storage location; and a printer which prints on an image forming medium based on the data of the page acquired by the interface.

2. A network system according to claim 1, wherein the controller further extracts data that can be displayed by the mobile terminal from the data of the page acquired by the modem and transmits it to the mobile terminal using the mobile terminal interface.

3. A network system according to claim 1, wherein the server further comprises a database which stores information in relation to the mobile terminal, the controller further executes authentication processing on the mobile terminal, on the basis of authentication data supplied by the mobile terminal interface from the mobile terminal and information stored in the database, and when the controller stores the data of the page, the controller judges a storage location corresponding to the mobile terminal authenticated by the authentication processing based on the database, and stores the data of the page in the storage location.

4. A network system according to claim 1, wherein the controller stores access information of the page in the storage location, together with the data of page acquired from the network, the image forming apparatus further comprises an operating section into which a user inputs instructions for operation, the printer prints data of the page stored in the storage location, the printing of the data of the stored page being instructed by the operating section, and the printer prints a present page, accessing the present page in accordance with the access information stored in the storage location, the printing of the present page among pages stored in the storage location being instructed by the operating section.

5. A network system according to claim 1, wherein the controller optimizes the data of the page acquired by the network and stores the data in the storage location.

6. A network system according to claim 1, wherein the image forming apparatus further comprises an image processing section which optimizes the data of the page acquired from the network.

7. A network system according to claim 1, further comprising a database which stores user information, wherein, when acquiring the data from the storage location, user authentication is executed based on user information stored in the database and information input by the user.

8. An image forming method for use in a network system comprising a server, which has a function of communicating with a mobile terminal, and an image forming apparatus, which has an image forming section that forms an image on an image forming medium, comprising:

acquiring data of a page which is made public on a network via a modem in response to a request from a mobile terminal interface for acquiring the page which is made public on the network;

storing the data of the page acquired by the modem in a predetermined storage location as instructed by the mobile terminal;

acquiring the data of the page acquired by the server from the network, from the storage location, in response to the image forming apparatus receiving an instruction for printing the data of the page stored in the storage location; and printing, on the image forming medium, using the data of the page acquired by an interface from the storage location.

9. An image forming method according to claim 8, further comprising:

extracting data that can be displayed by the mobile terminal from the data of the page acquired by the modem and transmitting the extracted data to the mobile terminal.

10. An image forming method according to claim 8, further comprising:

executing authentication processing on the mobile terminal on the basis of a database which stores information in relation to the mobile terminal and authentication data supplied from the mobile terminal, wherein said storing judges a storage location corresponding to the mobile terminal authenticated by the authentication processing based on the database, and stores the data of the page in the storage location.

11. An image forming method according to claim 8, wherein said step of storing further comprising storing access information of the page in the storage location, together with the data of the page acquired from the network, the image forming apparatus prints the data of the page stored in the storage location on the image forming medium, the printing of the stored data of the page being instructed by an operating section of the image forming apparatus, and the image forming apparatus prints a present page, accessing the present page in accordance with the access information stored in the storage location, the printing of the present page among pages stored in the storage location being instructed by the operating section.

12. An image forming method according to claim 8, the step of storing further comprising optimizing the data of the page acquired by the network based on size of printing performed by the image forming apparatus and storing the data in the storage location.

13. An image forming method according to claim 8, wherein the image forming apparatus further optimizes the data of the page acquired from the network based on size of printing.

14. An image forming method according to claim 8, further comprising:

performing user authentication based on user information stored in a database and information input by a user, when acquiring the data from the storage location.

15. An image forming method for use in a network system that includes a server that communicates with a mobile terminal, and an image forming apparatus that forms an image on an image forming medium, comprising:

acquiring data of a page which is made public on a network via the server in response to a request from a mobile terminal interface to acquire the page;

storing the acquired data in a predetermined storage location using the server, as instructed by the mobile terminal;

accessing the data stored in the storage location, in response to the image forming apparatus receiving an instruction for printing the data stored in the storage location; and printing the data accessed from the storage location on the image forming medium using the image forming apparatus.

* * * * *